United States Patent [19]
Duncan et al.

[11] Patent Number: 5,217,617
[45] Date of Patent: Jun. 8, 1993

[54] MULTI-CELL TRANSPORTABLE BIOSLURRY REACTOR

[75] Inventors: Steven P. Duncan, Taylorsville; Robert C. Emmett, Jr., Salt Lake City; Gunter H. Brox, Salt Lake City; William J. Grove, Jr., Salt Lake City; Douglas E. Hanify, West Valley City, all of Utah

[73] Assignee: Baker Hughes Incorporated, Houston, Tex.

[21] Appl. No.: 809,006

[22] Filed: Dec. 17, 1991

[51] Int. Cl.⁵ .......................... C02F 3/20; C02F 3/22
[52] U.S. Cl. .................... 210/620; 210/629; 210/194; 210/197; 210/201; 210/218; 210/219; 210/220; 435/262; 435/264
[58] Field of Search ............... 210/603, 620, 629, 194, 210/197, 201, 218, 219, 220, 221.2, 252; 366/102, 107, 293, 308, 326, 329; 435/262, 264

[56] References Cited

U.S. PATENT DOCUMENTS

| | | | |
|---|---|---|---|
| 1,642,051 | 9/1927 | Wall | 261/122 |
| 1,841,435 | 1/1932 | Gibson | 366/308 |
| 1,847,648 | 3/1932 | Harkom | 55/178 |
| 2,638,444 | 5/1953 | Kappe | 210/194 |
| 2,718,275 | 9/1955 | Banks | 261/122 |
| 3,043,433 | 7/1962 | Singer | 210/629 |
| 3,133,017 | 5/1964 | Lumbeth | 210/629 |
| 3,152,982 | 10/1964 | Pagnotti | 210/629 |
| 3,175,688 | 3/1965 | Zink | 210/613 |
| 3,441,216 | 4/1969 | Good | 261/122 |
| 3,495,712 | 2/1970 | Schreiber | 210/256 |
| 3,533,508 | 10/1970 | Scipp et al. | 210/220 |
| 3,537,583 | 11/1970 | Wahner et al. | 210/195.3 |
| 3,753,897 | 8/1973 | Lin et al. | 210/197 |
| 3,951,758 | 4/1976 | Purch | 210/220 |
| 4,045,344 | 8/1977 | Yokota | 210/194 |
| 4,238,338 | 12/1980 | Kinzer | 210/197 |
| 4,728,082 | 3/1988 | Emmett et al. | 266/168 |
| 4,732,608 | 3/1988 | Emmett et al. | 75/101 |
| 4,933,076 | 6/1990 | Oshima et al. | 210/629 |
| 4,968,008 | 11/1990 | Emmett et al. | 266/168 |
| 4,974,816 | 12/1990 | Emmett et al. | 266/168 |
| 5,007,620 | 4/1991 | Emmett et al. | 266/168 |
| 5,034,131 | 7/1991 | Stenroos et al. | 210/612 |
| 5,057,284 | 10/1991 | Emmett et al. | 266/168 |

FOREIGN PATENT DOCUMENTS

| | | |
|---|---|---|
| 520594 | 1/1956 | Canada . |
| 206933 | 2/1909 | Fed. Rep. of Germany . |
| 597241 | 2/1924 | France . |
| 855252 | 3/1940 | France . |
| 511048 | 2/1970 | Switzerland . |
| 800221 | 1/1980 | U.S.S.R. . |
| 899119 | 1/1982 | U.S.S.R. . |
| 1241377 | 8/1971 | United Kingdom . |
| 2180829 | 9/1985 | United Kingdom . |

OTHER PUBLICATIONS

Bioengineering AG brochure, Bioengineering foam separator system: . . . with active foam recycling (4 pages), undated.

Letter dated Oct. 10, 1990 from Rene Kleijntjens & attachments: Kleijntjens, et al., Technological and kinetical aspects of microbial soil decontamination in slurry reactors on mini-plant scale, 6 pages, 1989.

Ekato, Operation of the Ekato Foamjet, 3 pages, undated.

Frings (brochure), Vertical Defoamer Antimousse vertical Antiespumante, 4 pages, undated.

(List continued on next page.)

Primary Examiner—Stanley S. Silverman
Assistant Examiner—Christopher Upton
Attorney, Agent, or Firm—Trask, Britt & Rossa

[57] ABSTRACT

A transportable apparatus for biological treatment of a slurry of contaminated materials, including a series of square reactor cells having substantially parabolic lower portions, set at the same elevation and communicating in series. Gas diffusers are placed in each cell for aerating and mixing the slurry, and an airlift slurry transport system is employed for recirculating the slurry. The apparatus also has applicability to the treatment of water and waste water.

24 Claims, 3 Drawing Sheets

OTHER PUBLICATIONS

Dorrco Technical Manual, Section 32, *Agitator Slurry Mixer*, pp. 1-15, Dec. 1951.
EPA, Technology Profile Demonstration Program, *Detox Industries, Inc.*, pp. 25-26, Nov. 1988.
Schreiber, *Counter Current Aeration Tank Model GRZ*, 6 pages, Dec. 1979.
Wilfley Weber, Inc. (brochure), *A Research and Development Company Specializing in Fine Bubble Technology*, 5 pages, undated.
Wilfley Weber, Inc. (brochure), *The Wifley Weber Flotation Cell*, 18 pages, undated.
Schreiber (brochure), *Schreiber Counter Current Aeration Tank, Model GRD*, 7 pages, Dec. 1979.
Schreiber (brochure), *Schreiber Counter Current Aeration Tank Model GRO*, 9 pages, Dec. 1979.
Schreiber (brochure), *Counter Current Aeration Tank, Model GRV*, 1 page, Jan., 1981.
Schreiber (brochure), *Schreiber-Counter Current Aeration*, 4 pages, undated.
Schreiber (brochure), *Schreiber Counter Current Plants*, 4 pages, undated.
Schreiber (brochure), *Schreiber Counter Current Aeration Tank Model GR*, 9 pages, Dec. 1979.

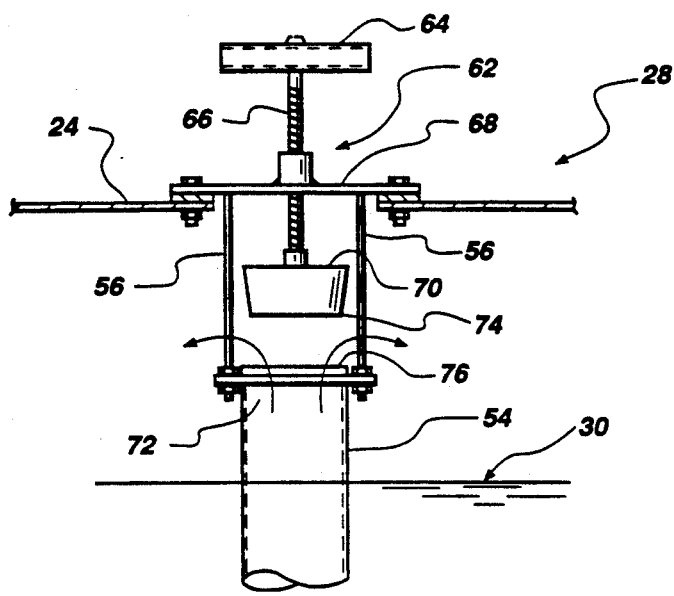
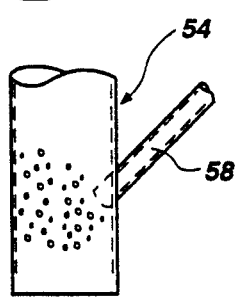
Fig. 4
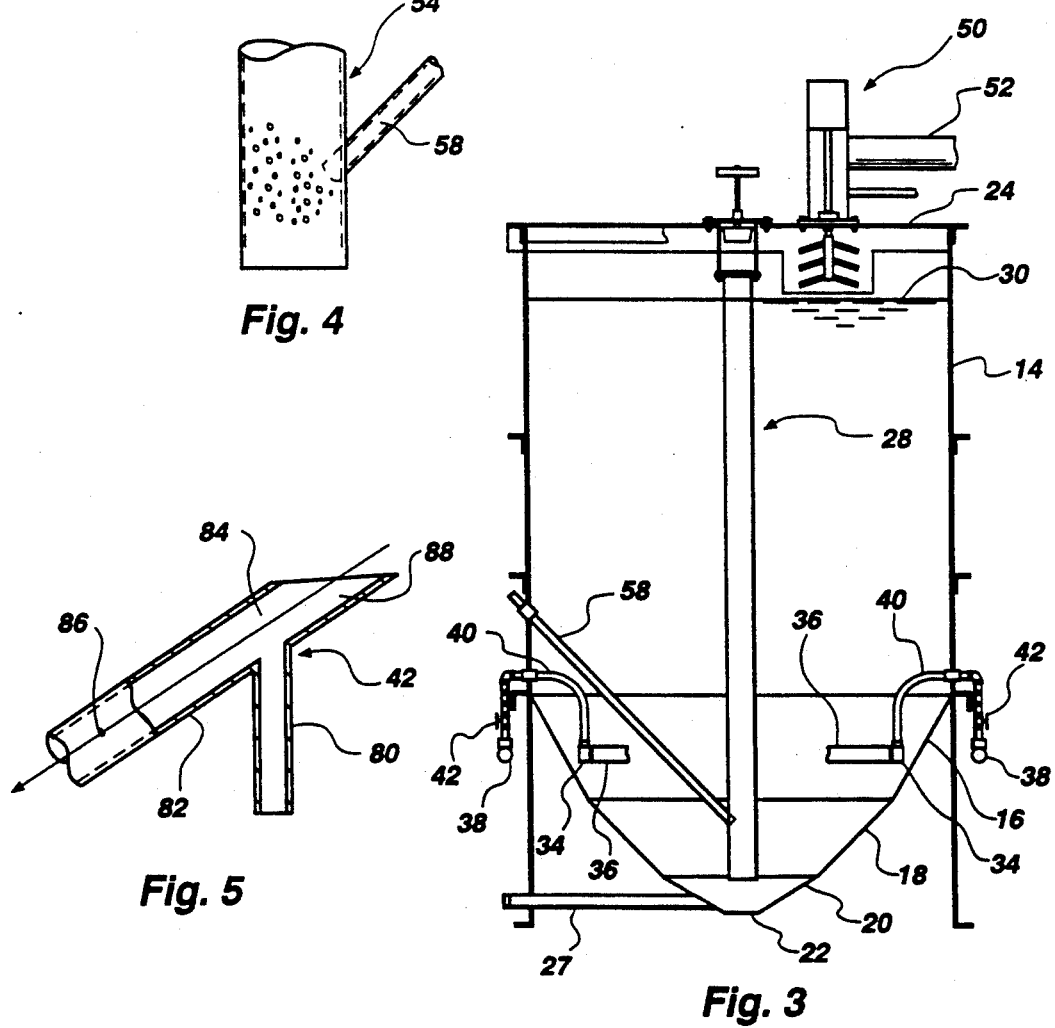
Fig. 5
Fig. 3

MULTI-CELL TRANSPORTABLE BIOSLURRY REACTOR

BACKGROUND OF THE INVENTION

1. Field of the Invention

This invention relates to apparatus for treating slurries containing minerals, soils and sludges which have been contaminated with toxic organic compounds, resulting in their classification as hazardous waste under environmental laws and regulations. More particularly, this invention is directed to an apparatus suited for treating hazardous waste-contaminated solids by means of a bacterial process, i.e., bio-oxidation, at the contaminated site The invention also has applicability to treatment of waste water.

2. Statement of the Art

Within the last decade, public concern regarding environmental pollution issues has increased markedly. As growing industrial activity continues to produce new and more complex waste byproducts, the need for safely disposing of those byproducts poses a critical problem for society. In the area of hazardous waste, this need is especially important in that the particular type of waste constitutes a threat to the health and safety of individuals exposed to them.

Former industry practices have resulted in spills and leaks which have led to the contamination of underground water supplies and surrounding soil. Moreover, past illegal disposal in now-abandoned waste dumps presently poses a threat to the environment and concerns nearby residents. Also, in many industrial facilities, waste water was previously disposed of in unlined lagoons which have leaked and contaminated the groundwater. These lagoons often contain considerable quantities of hazardous waste sludges. There is a pressing need to clean up contaminated waste sites and close existing industrial waste water lagoons.

Several treatment technologies are applicable and can be classified under the general categories of physical, chemical and biological treatment. With respect to biological treatment of soil or sludges, one can differentiate between in situ treatment and the treatment of liquefied soil slurries in reactor vessels. The apparatus of the present invention falls into the latter category.

Presently, several other bioslurry reactor systems are being commercialized The first system, developed by Bogard Environmental Services, Inc. of Mt. Juliet, Tenn. involves technology adapted for use in treating pesticides, PCB's, dioxins and halogenated and non-halogenated organic compounds. While having presently demonstrated effectiveness for treating sludge, liquids and soils having high organic concentrations, this process has been found to be unsuitable for use with inorganic laden wastes.

The second technology, developed by Detox Industries, Inc. of Sugarland, Tex., is directed for use in treating chlordane, myrex, oil, phenolics, polycyclic aromatic hydrocarbons, creosote, pentachlorophenol (PCP) and polychlorinated biphenyls (PCB's).

The Detox system includes an open reaction tank or on-site created lagoon which utilizes a synthetic liner. The tank is adapted to retain a slurry and is fitted with air distributors.

Another bioslurry reactor consisting of several agitated and aerated vessels has been used in a pesticide spill application by ECOVA of Redmond, Wash.

Common to all three of the above-described systems is the fact that they are operated in a batch mode. After the contaminated soil has been first processed through a classification or soil wash system, the soil and water are placed into the reactor vessel, this slurry is aerated until a desired residual contaminant level is reached, whereupon the supernatant water is usually recycled and the slurry is discharged. Due to the ongoing aeration, many volatile organic substances are not biodegraded but simply are air-stripped. Some systems treat the volatiles in a carbon adsorption filter whereas others simply discharge them to the atmosphere.

Yet another slurry reactor system has been developed by Umwelt Schutz Nord of Ganderkesee, Germany, which system, to the best of our knowledge, employs an inverted trapezoid-shaped reactor and a screw auger at the tank bottom to transport coarser, settling solids. This system may be operated in a continuous mode, but is mechanically complex and expensive to build and operate.

Still another system is under development by the Delft University of Technology of The Netherlands. The Delft design employs two reactors in series, the first of which also acts as a separator from which the coarser, settled particles are transported directly to a dewatering system into which the finer particles are transported after treatment in the reactors. The system maintains the contaminated solids in a three-phase (solid-liquid-gas) slurry suspension in a fluidized bed. While effective, such a design requires a great deal of energy to maintain the suspension during the bioreaction process. In addition, the Delft design employs reactor vessels with a steeply sloped lower hopper portion (60° from horizontal) which greatly increases the height of the reactor vessel for a given volume.

Both of the foregoing systems have apparently been designed for transport to the contaminated site and for use in conjunction with a soil washing pretreatment step which reduces the volume of soil to be treated in the bioslurry reactor. Such methodology being part of the prior art, and not a part of the present invention, no further description thereof will be made.

Common to all hazardous waste treatment systems utilizing bacterial activity is the requirement of providing an adequate supply of oxygen and nutrients to the bacteria. This provision allows biomass growth and facilitates the occurrence of biochemical reactions, thereby leading to the production of carbon dioxide and water as final products The clean up of hazardous waste sites requires innovative approaches that are cost effective. As has been the case in the waste water treatment sector, biological systems can also play an important role in soil bioremediation. It is important to develop reactor vessels and processes that can achieve high biokinetic degradation rates in order to handle high solids concentrations and large throughput volumes.

In addition, it has been determined that there are many contaminated sites in which the volume of contaminants does not justify the erection of a large volume, permanent type of system, but in which the volume of contaminants renders transport of same to a remote site impractical, even after consolidation of the contaminants in a smaller volume. As previously noted, transportable systems have been under development, but suffer from major deficiencies insofar as manufacturing and operating costs are concerned.

SUMMARY OF THE INVENTION

The apparatus of the present invention comprises a multi-cell transportable bioslurry reactor system of a simple but eminently practical design, which employs no moving parts in the vessels or cells of the reactor for slurry agitation and transport, and which may be operated in a continuous feed and treatment mode.

The present invention includes a plurality of gastight reactor vessels or cells disposed in a battery at a common elevation and connected in series. In the preferred embodiment, four vessels or cells are mounted on a transport vehicle, such as a trailer, and are sized so as not to require special permits for the transport vehicle for highway travel. The reactor cells are preferably of square horizontal cross-section, so as to maximize available internal treatment volume per transport vehicle, and include an upper, vertically-walled major portion which communicates with a lower, minor portion of similar square horizontal cross-section but which approximates a parabolic curve when viewed in vertical cross-section.

An airlift slurry transport system is employed in the center of each cell, and comprises a draft tube extending from near the cell bottom to an elevation slightly above the normal slurry level in the cell. The transport system, which comprises substantially the sole means for recirculating slurry in each cell, includes a vertical draft tube which is provided with pressurized air near its lower end from air supply piping extending from the exterior of the cell. A flow control valve is located at the top of the draft tube.

At least one bank of diffusers for aerating and mixing the slurry is disposed in each cell, in the general vicinity of the joinder of the upper and lower portions of the cell. The diffusers are preferably of tubular configuration, and arranged in a horizontal plane and in parallel orientation. In the preferred embodiment, two banks of diffusers extend toward each other from parallel manifolds on opposite sides of the cell in perpendicular disposition to the manifolds. The diffusers are provided with air from air supply piping extending from the cell exterior. The air discharged from the diffusers contributes significantly to the mixing of the slurry which reduces stratification.

The first cell of the plurality is fed through an inlet nozzle from a slurry feed tank, and each subsequent cell receives slurry from the next preceding one via a Y-shaped slurry transfer manifold which promotes equal slurry levels in all cells in a series as well as ensuring that no cell is unintentionally pumped dry. The last cell in a series includes a slurry outlet pipe which transports the treated slurry to a dewatering system or other post-treatment device as known in the art.

In applications where foaming is expected to be a problem, a mechanical foam abatement system can be located at the top of one or more cells, in combination with an off-gas nozzle for removal of gas injected into the slurry by the diffusers or generated by the bioreaction process. These two elements are preferably combined so that the gas is removed without the entrainment of foam. The preferred foam abatement system comprises a motor-driven shaft having blades or paddles attached thereto via hinge means, rotation of the shaft causing extension of the blades or paddles from the vertical toward the horizontal, and a high shear type impeller mounted below the slurry surface to cause movement of the foam across the slurry surface toward the blades or paddles.

In operation, each cell is filled with a slurry of contaminated solids, and air for mixing the slurry and sustaining the bioreaction effected by bacteria in the cell is introduced into the slurry via the diffusers. Nutrients and additional bacteria may also be introduced into the cells from time to time, as required. The airlift system transports coarser or heavier particles which are not maintained in suspension from the bottom of the cell to the top thereof, where they are discharged above the surface of the slurry. The parabolic design of the cell's lower portion encourages the non-suspended particles to gravitate toward the cell center and the air lift draft tube intake, but provides much greater internal cell volume than a single steep angle, linear design. As the cell slurry reaches a certain level, it overflows into the next adjacent cell via the aforementioned slurry transport manifold. At the end of the cell series, the treated slurry is removed for further processing, such as dewatering.

BRIEF DESCRIPTION OF THE DRAWINGS

FIG. 3 is a sectional elevation of a reactor cell according to the present invention, taken along lines 3—3 in FIG. 1;

FIG. 4 is an enlarged side sectional elevation of the airlift slurry transport system utilized in the present invention;

FIG. 5 is an enlarged side sectional elevation of the inter-cell slurry transport manifold utilized in the present invention;

DETAILED DESCRIPTION OF THE PREFERRED EMBODIMENTS

Figure 1:
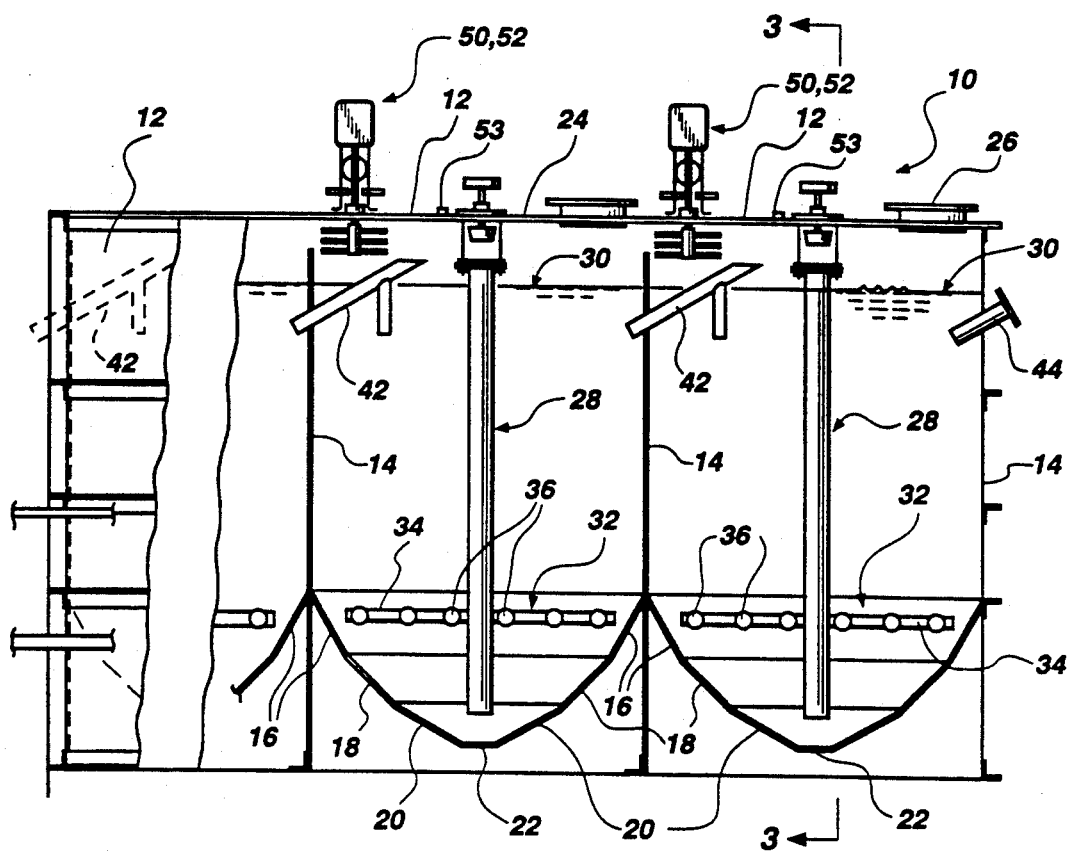
FIG. 1 is a partial side sectional elevation of the multi-cell reactor of the present invention.
Figure 2:
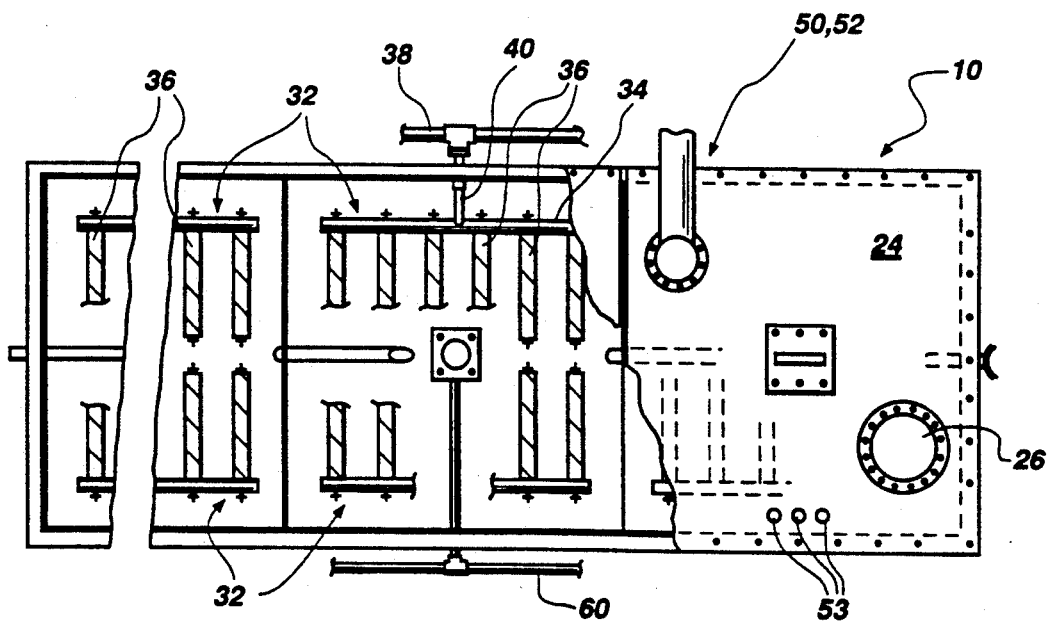
FIG. 2 is a partial top sectional elevation of the multi-cell reactor of the present invention.

Referring to FIGS. 1-3 of the drawings, the major elements of the multi-cell transportable bioslurry reactor 10 of the present invention will be described. Reactor 10 includes a plurality or battery of square reactor cells 12 in series communication. While other cell configurations are possible, square cells are preferred to maximize internal volume for slurry treatment. Cells 12 each include a major upper portion defined by vertical walls 14, and a minor lower portion joined to the upper portion and defined by a series of adjacent flat wall sections 16, 18, 20 and 22 preferably formed of four generally triangular plates joined at their lateral peripheries and bent between sections so as to be disposed at ever-decreasing angles to the horizontal (see FIGS. 1 and 3) to approximate a parabolic curve. Sections 16 are preferably extended at substantially a 60° angle, sections 18 at substantially a 45° angle, sections 20 at substantially a 30° angle, and sections 22 at substantially a 0° angle, or horizontally. To facilitate vessel fabrication, section 22 may comprise a single square plate. Each cell 12 is covered with a gas-tight cover 24, it being understood that a single such cover may be used to span all of the cells, or individual covers may be employed. Manholes 26 permit access to each cell 12 through tank cover 24. At the bottom of each cell is a drain piping 27 (see FIG. 3) including a valve therein (not shown) to permit selective drainage of each individual cell such as at the end of a treatment operation or for backflushing of the airlift in a particular cell 12. Cells 12 and all components thereof may be formed of any suitable material, such as stainless steel, epoxy-coated steel, rubber lined steel, or fiberglass.

Disposed within each cell 12 is an airlift slurry transport system 28, centered in the cell and extending vertically from the lower portion thereof to an elevation above the slurry level 30 in the cells. Airlift slurry transport system 28 comprises substantially the only recirculating means for the slurry under treatment.

In the preferred embodiment of the invention, two diffuser banks 32 are disposed in each cell in the area wherein the upper portion joins the lower portion, and preferably within the top of the lower portion. The stationary diffuser banks 32 comprise, in addition to the airlift, the only other mixing means for the slurry under treatment, in addition to providing aeration of the slurry. Each diffuser bank 32 includes a manifold 34 oriented in the horizontal plane and parallel to the side of the cell near the wall thereof. A plurality of tubular fine bubble diffusers 36, in this instance six (6), extend inwardly from and perpendicular to each manifold 34 in the horizontal plane. Diffusers 36 each include an elastic, permeable, porous replaceable membrane having a hydrophobic outer surface, the membranes including extremely small slits having a mean length of 2 mm or less. Preferred embodiments of the diffusers 36 may utilize membranes fabricated from materials which are chemically resistant to the contaminants contained in the slurry. Such materials may include various rubber compounds, polypropylene, fluorinated elastomers, and/or similar compounds. Each manifold 34 is provided with an air supply via piping 38 which extends down each side of the cell battery and which communicates with manifolds 34 via laterals 40 having control valves 42 associated therewith.

While the diffuser banks 32 have been illustrated in a particular disposition and orientation, it should be understood that alternative diffuser arrangements may be employed in the invention. For example, diffusers 36 may extend substantially all the way across cells 12 from opposite sides, so as to be interleaved with those from the opposite side. Moreover, in such an arrangement, one bank may be offset in elevation from the other. Moreover, each manifold 34 may include a plurality of orifices each associated with a single diffuser 36, so as to provide the ability to adjust the volume of air directed to each diffuser 36.

Each cell 12 in the battery is in communication with its adjacent cells 12 via slurry transport manifolds 42, the first cell 12 in the battery receiving contaminant-laden slurry through an inlet nozzle 44 and the last cell discharging treated slurry through a manifold 42 to a dewatering system or other post-treatment device as known in the art.

A foam abatement system 50 is located at the top of each cell 12 or a battery of several cells and extends through cover 24, maintaining the gas-tight integrity. An off-gas nozzle assembly 52 is integrated into the foam abatement system 52 to allow the removal of the air injected into the reactor via the diffusers and the airlift system.

One or more of the cells 12 of reactor 10 may be provided with ports 53 for instrumentation, each as temperature and pressure sensors, pH and $O_2$ sensors, etc., as is known in the art, as well as for inlet lines or pipes for nutrients beneficial to the bioreaction process, and/or the introduction of supplementary bacteria.

The reactor 10 comprising a battery of cells 12 is dimensioned so as to be of a width and length suitable for highway transport on a truck or trailer without a special permit. Ancillary equipment, such as will be discussed in the following portion of the specification, may be mounted on the same transport vehicle or preferably on a companion vehicle for travel to the job site. It is preferred that reactor 10 be configured as a skid mounted unit, for removal from the transport vehicle at the job site. The skid may be placed on a compacted sand bed and leveled. No further securing is necessary.

Referring now to FIGS. 3 and 4, airlift slurry transport system 28 includes draft tube 54, which is centrally and vertically suspended in cell 12 via hanger rods 56 to extend above the upper level 30 of the slurry in the cell. Airlift air supply lateral 58 extends from air supply piping 60 on the exterior of the cell 12 to a location near the bottom of draft tube 54. Airlift flow control valve 62 is located at the top of draft tube 54, and comprises handle 64, screw 66, threaded cover 68 through which screw 66 extends, and tapered plug 70 secured to the bottom of screw 66. In its fully open position, shown in FIG. 4, plug 70 is suspended above the top 72 of draft tube 54. In its fully closed position, the smaller diameter lower portion 74 of tapered plug 70 will enter draft tube 54 and plug 70 will seat against the upper rim or edge 76 of draft tube 54. Of course, flow control valve 62 could be supplied with a motorized drive, if desired, and electronic sensor means employed to determine the position of plug 70 with respect to draft tube 54. However, such is unnecessary to the operation of the invention and not in keeping with the economical nature of the reactor type.

Slurry transport manifold 42 is illustrated in enlarged section in FIG. 5, and comprises a vertical tubular section 80 which intersects obliquely-oriented tubular section 82. In operation, when slurry level 30 reaches an elevation in a cell 12 corresponding to that of the intersection 84 of sections 80 and 82 of the manifold, the slurry will travel in the downstream direction indicated by arrow 86 to the next adjacent cell 12 or, if the last cell in the battery, to post-treatment processing. The upper portion 88 of tubular section 82 provides an air vent to promote flow, and also receives some of the discharge from the top of the airlift draft tube 54.

Figure 6:
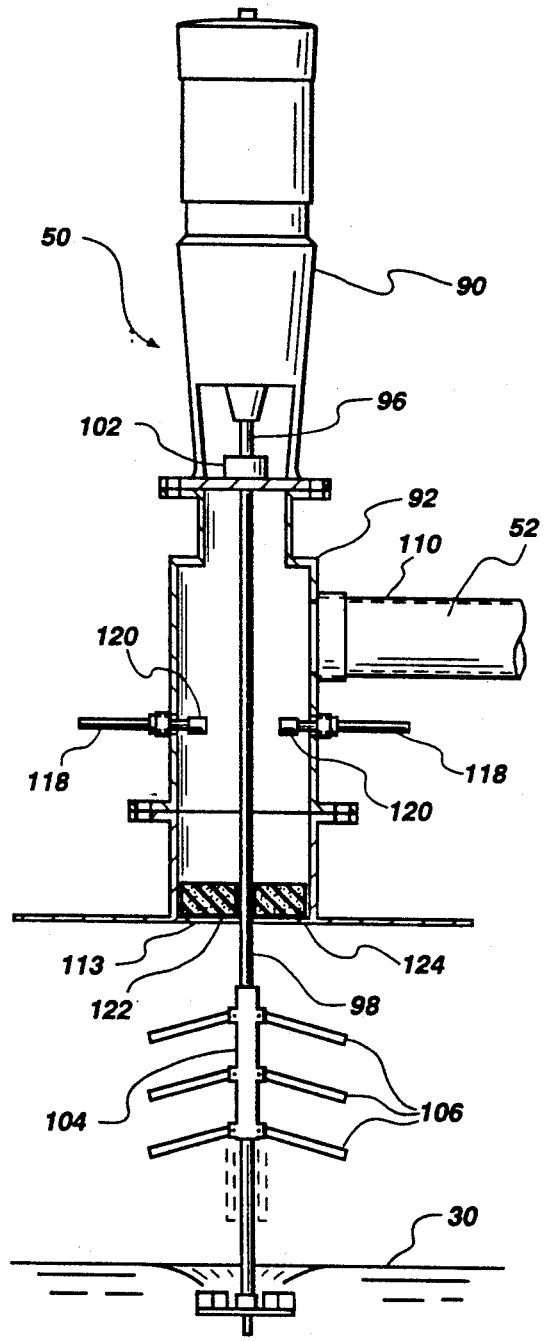
FIG. 6 is an enlarged side sectional elevation of a preferred combined foam abatement system and off-gas nozzle suitable for use with the present invention.

FIG. 6 of the drawings depicts a foam abatement system 50 suitable for use with the present invention, system 50 including a suitable drive means 90 such as an electric motor, secured to tee-shaped tubular motor mount 92 and disposed above tank cover 24, to which motor mount 92 is secured. Drive shaft 96 of motor 90 is coupled to drive shaft 98, shaft 98 extending into the interior of cell 12 through a sealed bearing assembly 102. On the interior of cell 12, hub 104 extends coaxially from and is secured to shaft 98. Foam destruction paddles or blades 106 are secured by hinge means 108 to hub 104, the illustrated embodiment depicting three (3) layers of four (4) blades 106 disposed at 90° intervals about hub 104. However, more or fewer layers of blades 106 may be employed, and more or fewer blades per layer. In addition, the layers may be rotationally offset from one another, so that the blades 106 may hang freely without interference with lower blades or hinge means. Blades 106, as shown in broken lines in FIG. 6, hang substantially vertically when motor 90 is not activated, permitting easy insertion and withdrawal of the entire assembly from a cell 12 through the top of motor mount 92. When motor 90 is activated, blades 106 swing outwardly and upwardly to a horizontal or near-horizontal position to contact and "chop" the foam in the cell above the level 30 of the slurry. A high shear impeller 108, such as a Rushton turbine, is located proximate the lower end of shaft 98, and is submerged beneath the surface of the slurry. When shaft 98 is rotated, impeller 108 draws foam along the slurry surface and into the vortex formed by the impeller.

Off-gas nozzle 52 includes conduit 110 secured to motor mount 92. Spray water pipes 118 extend through the wall of motor mount 92, and spray nozzles 120 are secured to the end of pipes 118 in a downward-facing orientation. Below nozzles 120, an open-cell foam or other suitable annular mist pad 122 is disposed across aperture 113 and rests on annular lip 124, shaft 98 extending therethrough. During operation of reactor 10, gas from each cell 12 is withdrawn for filtration or treatment and venting to the atmosphere, or for compression and reinjection into the cells via diffuser banks 32 and/or airlift transport system 28. Mist pad 122 precludes substantially any liquid vapor and foam from being withdrawn from the cells 12, and intermittent operation (such as by a timer) of a water spray through spray nozzle 120 serves to keep pad 122 from clogging.

Figure 7:
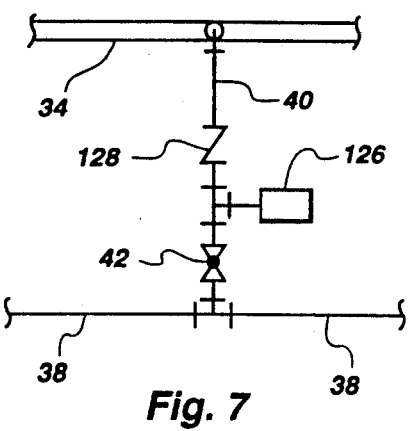
FIG. 7 is a schematic of the diffuser air supply piping.

FIG. 7 schematically depicts the diffuser air supply piping system, piping 38 on each side of the cell battery feeding air flow control valve 42 in series with air flow indicator 126 and check valve 128, to prevent backflow from cells 12 through manifolds 34 and laterals 40. Piping 38 is supplied with air by suitable supply means, such as an air compressor.

Figure 8:
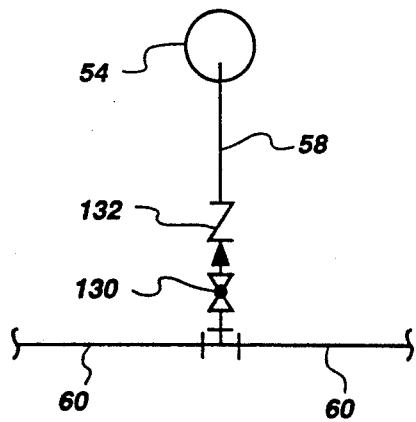
FIG. 8 is a schematic for the airlift air supply piping schematic.

FIG. 8 schematically depicts the airlift air supply piping, commencing with feed piping 60 which supplies air to air flow control valve 130 in series with check valve 132, feeding lateral 58 extending to the lower interior of draft tube 54.

The elements of the bioslurry reactor 10 of the present invention having been described above, operation of the reactor 10 will be outlined hereafter with primary reference to FIGS. 1-5. Soil slurry which has been obtained after several separation and soil washing steps well known in the art, preferably to a size of less than approximately 100 mesh, is fed into the first cell 12 of reactor 10 via inlet nozzle 44. Normally, indigenous bacterial organisms in the contaminated slurry are employed in the bioreaction process, but additional and/or different organisms may be added to expedite the bioreaction. Nutrients will also have to be added, such as, for example, nitrogen and phosphorous compounds. The bacterial organisms pass with the slurry from cell to cell, growing and adapting to the available food and, if aerobic in nature, oxygen supply. As the slurry solids begin to settle in the tank, the majority of solids particles are being kept suspended in the slurry and continuously mixed by the fine gas bubbles emanating from diffusers 36, the gas bubbles also providing oxygen for support of the bio-oxidation process, if such is an aerobic process. Those solids which do not suspend will settle to the bottom of cell 12, the shape of which ensures that the solids will slide inwardly to a location proximate the bottom of draft tube 54 where they are collected and pumped up to the top of the cell by airlift slurry transport system 28. The airlifted solids are discharged from the top 76 of draft tube 54 in all directions, most of the solids dropping back into the cell to be repeatedly airlifted and washed in the process as well. However, some of the solids are discharged into the upper, open portion 88 of slurry transfer manifold 42 from where they pass to the next cell of the reactor. If the slurry level 30 is normal, that is to say at the intersection 84 of sections 80 and 82 of transfer manifold 42, most of the slurry so collected will pass to the next cell 12. If the slurry level 30 is too low, most of the slurry will drop back into the same cell 12 via section 80 of manifold 42. If slurry level 30 is above normal, slurry from the cell will overflow intersection 84 and pass to the next cell 12 via section 82 of manifold 42. The transfer system is thus self-leveling, and the slurry level, once all of the cells are filled, will remain substantially constant and the total residence time of the slurry in reactor 10 may be controlled by the slurry feed rate into the first cell of the battery through inlet nozzle 44. On small volume jobs, one multi-cell reactor 10 may be employed in a closed-loop batch mode, wherein the slurry exiting the last cell 12 in a series may be reintroduced to the first cell 12 via a slurry pump in a continuous manner until the remediation operation is complete. On larger jobs, two or more reactors 10 will be placed in series, and the slurry treated in a single pass through all the reactors.

Formation of biological foam is inherent in many of the bioreaction processes, but is continuously destroyed in cells 12 via the operation of foam abatement system 50. Likewise, gas is introduced through the diffusers in cells 12 and is withdrawn therefrom for treatment and venting. Embodiments of gas recirculating systems suitable for use with the present invention are disclosed in U.S. patent application Ser. No. 07/612,585, filed Nov. 5, 1990, and Ser. No. 07/322,666, filed Mar. 13, 1989, both applications being assigned to the Assignee of the present invention and hereby incorporated herein by this reference. Such gas recirculating systems forming no part of the present invention, no further description of same will be made.

Of course, in lieu of using a treatment loop for gas recirculation, the gas may simply be vented to the atmosphere through a carbon filter or propane-fired catalytic converter, and this approach may be preferable and more economical for smaller jobs where the volume of volatile contaminants may be relatively small.

In case of a power outage, airflow to the airlift slurry transport system 28 and diffuser banks 32 will cease, and the slurry will settle out in the cells 12. The slurry solids, when settled, will densely pack on the bottom of the cells around the bottoms of draft tubes 54, and resumption of the airlift may be prevented by the packed solids. To remedy the situation after air has been restored, airlift flow control valve 62 may be closed, the air in draft tubes 54 then backing up and exiting the bottoms thereof in an air-scouring action to loosen the packed solids. Thereafter, valve 62 can be opened and airlift flow resumed.

The slurry temperature in the reactor 10 may be controlled. Depending on the particular bacteria employed in the vessel, the temperature will generally be maintained within the range of 20°-35° C. This temperature may be controlled by preheating the feed slurry being added to the reactor 10. Additionally, the reactor cells 12 themselves can be insulated to assist in retaining heat or may be provided with heating elements.

Depending on the application, any number of reactor cells can be arranged in series to permit continuous feed and overflow. The more cells that are arranged in series, the more the system approaches true plug flow conditions. At the same time, optimum biokinetic rate is achieved in each stage, as the bacteria population is fully acclimated or adapted to the organic contaminants and the biomass concentration has reached an optimum in accordance with substrate concentrations available.

Alternatively, as noted above, the reactor of the invention can be run in a batch or a semi-continuous feed mode. Kinetic rates will be somewhat slower because of the lag phase in bacterial activity as a result of acclimatization and biomass growth.

Total hydraulic residence time in the reactor of the present invention will vary depending on the nature of the organic contaminants, their concentrations, and clean-up level required. After bioreaction treatment, the slurry may be dewatered. The dewatering may be accomplished, as known in the art, in a variety of ways. Pressure filters, thermal dryers, vacuum filters, or centrifuges, or combinations thereof, may be employed. The most efficient and economical dewatering equipment is dependent on the characteristics and the quantities of slurry to be processed and must be evaluated on a case-by-case basis.

While disclosed in terms of bacterial treatment of a contaminated sludge or slurry, it is also contemplated that the apparatus of the present invention may be useful for treatment of water and waste water. In such an application, particulate treatment media, such as, for example, activated carbon, is mixed with the water and the resulting slurry introduced into the battery of reactor cells, wherein the airlift and diffusers enhance the treatment process, the apparatus thus being used as a digester. After the treatment process is completed, the treatment media is separated from the water and may be discarded or processed and reused.

While the present invention has been described in terms of a preferred embodiment, it is not so limited. Numerous additions, deletions and other modifications to the embodiment illustrated and discussed herein will be readily apparent to one of ordinary skill in the art, and may be effected without departing from the spirit and scope of the invention or claimed herein.

What is claimed is:

1. An apparatus for bacterial treatment of a slurry formed from minerals, soils, or sludges contaminated with organic compounds, comprising:
a reactor including at least one cell of substantially square horizontal cross-section and having an upper vertically walled portion and a contiguous lower portion of substantially parabolic-walled configuration, said at least one cell having means for containing a fixed volume of said slurry including said bacteria;
slurry transport means for recirculating said slurry within said at least one cell, including a substantially vertically and centrally disposed draft tube extending from a lower end proximate and above the bottom of said at least one cell to an upper end above said fixed volume of slurry, gas supply means extending from the exterior of said at least one cell to an outlet opening into said draft tube proximate said lower end thereof, and a flow control valve above said gas supply means outlet for selectively closing said draft tube; and
gas distribution means disposed within said at least one cell and including a plurality of diffusers for receiving a gas and distributing same into said slurry in the form of fine bubbles, said plurality of diffusers substantially surrounding said draft tube and extending horizontally substantially across said at least one cell.

2. The apparatus of claim 1, wherein said gas distribution means comprises, but for said transport means, substantially the sole means for mixing said slurry in said at least one cell.

3. The apparatus of claim 1, wherein said transport means comprises, but for said gas distribution means, substantially the sole means for recirculating said slurry in said at least one cell.

4. The apparatus of claim 1, wherein the wall of said lower portion of said cell is disposed at substantially 60° to the horizontal orientation at its uppermost extent and at a substantially horizontal orientation at its lowermost extent.

5. The apparatus of claim 1, wherein said plurality of diffusers comprises at least one plurality of adjacent, tubular, parallel diffusers oriented on a horizontal plane and fed from a common manifold.

6. The apparatus of claim 5, wherein said adjacent, tubular, parallel plurality of diffusers comprises two pluralities of such diffusers extending toward each other from opposite sides of said at least one cell.

7. The apparatus of claim 1, further including:
foam abatement means for mechanically destroying foam generated by said bacterial slurry treatment from a volume in said at least one cell above said slurry volume; and
off-gas nozzle means for removing gas generated by said bacterial slurry treatment from said at least one cell through said volume.

8. The apparatus of claim 3, wherein said foam abatement means comprises a rotating shaft means having blade means hingedly attached at one end to said rotating shaft means.

9. The apparatus of claim 8, wherein said blade means comprises a plurality of blades radially disposed about and hingedly attached to said rotating shaft means.

10. The apparatus of claim 9, wherein said plurality of blades are deployed longitudinally along said shaft means in a plurality of layers.

11. The apparatus of claim 10, wherein the blades of each of said layers are rotationally offset from those of another of said layers.

12. The apparatus of claim 8, wherein said foam abatement means further includes fixed blade impeller means mounted on said shaft below said blade means.

13. The apparatus of claim 1, wherein said at least one cell comprises a plurality of cells, communicating in series and disposed at a substantially common elevation.

14. The apparatus of claim 1, wherein said plurality of diffusers comprises a plurality of flexible membrane diffusers.

15. An apparatus for bacterial treatment of a slurry formed from minerals, soils, or sludges contaminated with one or more organic compounds, comprising:
a reactor for containing said slurry including said bacteria, including at least one cell for containing a fixed volume of said slurry, said at least one cell being of substantially square horizontal cross-section and having an upper vertically walled portion and a contiguous lower portion of substantially parabolic-walled configuration;

stationary slurry transport means for recirculating said slurry within said at least one cell, including a substantially vertically and centrally disposed draft tube extending from a lower end proximate and above the bottom of said at least one cell to an upper end above said fixed volume of slurry in said at least one cell, gas supply means extending from the exterior of said at least one cell to an outlet opening into said draft tube proximate said lower end thereof, and a flow control valve above said gas supply means outlet for selectively closing said draft tube; and stationary gas distribution means disposed within said at least one cell and including a plurality of flexible membrane diffusers for receiving a gas and distributing same into said slurry in the form of fine bubbles, said plurality of diffusers substantially surrounding said draft tube and extending horizontally substantially across said at least one reaction cell.

16. The apparatus of claim 15, further including foam abatement means for mechanically destroying foam generated by said bacterial slurry treatment from a volume in said at least one cell above said slurry volume.

17. The apparatus of claim 16, wherein said foam abatement means comprises a rotating shaft means having blade means hingedly attached at one end to said rotating shaft means.

18. The apparatus of claim 17, wherein said blade means comprises a plurality of blades radially disposed about and hingedly attached to said rotating shaft means.

19. The apparatus of claim 18, wherein said plurality of blades are deployed longitudinally along said shaft means in a plurality of layers.

20. The apparatus of claim 19, wherein the blades of each of said layers are rotationally offset from those of another of said layers.

21. The apparatus of claim 17, wherein said foam abatement means further includes fixed blade impeller means mounted on said shaft below said blade means.

22. The apparatus of claim 16, further including off-gas nozzle means for removing gas generated by said bacterial slurry treatment from said cell through at least a portion of said volume.

23. A method of bacterially treating a slurry of particulate material contaminated by one or more organic compounds comprising:

providing a reaction cell having a centrally located vertically disposed draft tube therein and a horizontally extending diffuser bank substantially surrounding said draft tube in the lower portion thereof;

providing a volume of said slurry in said reaction cell;

introducing gas into said draft tube and thereby recirculating said slurry therethrough from the bottom of said reaction cell to the top thereof;

introducing gas into said diffuser bank and thereby mixing said slurry across substantially the entire horizontal cross-section of said reaction cell above said diffuser bank;

ceasing gas flow into said draft tube and said diffuser bank, whereby solids in said slurry settle to the bottom of said reaction cell;

closing said draft tube; recommencing gas flow into said closed draft tube and out of the lower end thereof to cause said settled solids to loosen; and opening said draft tube and recommencing recirculation of said slurry therethrough.

24. An apparatus for treatment of contaminated water with a particulate treatment media, comprising:

a reactor including at least one cell of substantially square horizontal cross-section and having an upper vertically walled portion and a contiguous lower portion of substantially parabolic-walled configuration, said at least one cell having means for containing a fixed volume of a slurry of said contaminated water and said particulate treatment media;

transport means for recirculating said slurry within said at least one cell, including a substantially vertically and centrally disposed draft tube extending from a lower end proximate and above the bottom of said cell to an upper end above said fixed volume of slurry, gas supply means extending from the exterior of said at least one cell to an outlet opening into said draft tube proximate said lower end thereof, and a flow control valve above said gas supply means outlet for selectively closing said draft tube; and gas distribution means disposed within said at least one cell and including a plurality of diffusers for receiving a gas and distributing same into said slurry in the form of fine bubbles, said plurality of diffusers substantially surrounding said draft tube and extending horizontally substantially across said at least one reaction cell.

* * * * *